US012647185B2

(12) United States Patent
Zhang et al.

(10) Patent No.: US 12,647,185 B2
(45) Date of Patent: Jun. 2, 2026

(54) OPTICAL TRANSCEIVER

(71) Applicant: Global Technology Inc., Ningbo (CN)

(72) Inventors: Xin Zhang, Ningbo (CN); Qilin Hong, Ningbo (CN); Kejun Chen, Ningbo (CN); Taotao Ye, Ningbo (CN)

(73) Assignee: Global Technology Inc., Ningbo (CN)

( * ) Notice: Subject to any disclaimer, the term of this patent is extended or adjusted under 35 U.S.C. 154(b) by 799 days.

(21) Appl. No.: 18/159,768

(22) Filed: Jan. 26, 2023

(65) Prior Publication Data

US 2024/0063912 A1 Feb. 22, 2024

(30) Foreign Application Priority Data

Aug. 19, 2022 (CN) .......................... 202210997169.3

(51) Int. Cl.
*H04B 10/40* (2013.01)
(52) U.S. Cl.
CPC .................................... *H04B 10/40* (2013.01)
(58) Field of Classification Search
CPC .................................................. G02B 6/4261
See application file for complete search history.

(56) References Cited

U.S. PATENT DOCUMENTS

2005/0157987 A1* 7/2005 Dodds ................. G02B 6/4255
385/92

* cited by examiner

*Primary Examiner* — Chad H Smith
(74) *Attorney, Agent, or Firm* — Secant IP PLLC

(57) ABSTRACT

An optical transceiver includes housing, fastening structure, confining protrusion, slider and handle. Fastening structure is disposed on assembling side of housing and fastened with counterpart of cage. Confining protrusion protrudes from assembling side of housing. Slider includes body and elastic arm. Elastic arm includes cantilever and hook. Cantilever includes fixed end part and movable end part opposite to each other. Fixed end part is fixed to body. Hook protrudes from movable end part toward housing. Body is slidably disposed on assembling side of housing. Handle is pivotally connected to assembling side of housing. At least a part of body is located between handle and fastening structure. Hook is located on a side of handle located closest to confining protrusion. Handle is configured to move body to push fastening part of cage to force fastening structure to be removed from counterpart.

10 Claims, 7 Drawing Sheets

OPTICAL TRANSCEIVER

CROSS-REFERENCE TO RELATED APPLICATIONS

This non-provisional application claims priority under 35 U.S.C. § 119(a) on Patent Application No(s). 202210997169.3 filed in China on Aug. 19, 2022, the entire contents of which are hereby incorporated by reference.

BACKGROUND

1. Technical Field

The present disclosure relates to an optical transceiver, more particularly to an optical transceiver including a handle and a slider.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

Generally, as to an optical transceiver, a fastening structure is provided for securely fixing the optical transceiver to the cage. Also, a reliable and low-cost mechanism is needed to facilitate the fastening structure to be assembled to or released from the cage while reducing the manufacture cost of the optical transceiver.

SUMMARY

According to one aspect of the present disclosure, an optical transceiver configured to be fastened with a counterpart of a fastening part of a cage and includes a housing, a fastening structure, a confining protrusion, a slider and a handle. The fastening structure is disposed on an assembling side of the housing and fastened with the counterpart. The confining protrusion protrudes from the assembling side of the housing. The slider includes a body and an elastic arm. The elastic arm includes a cantilever and a hook. The cantilever includes a fixed end part and a movable end part that are opposite to each other. The fixed end part is fixed to the body. The hook protrudes from the movable end part toward the housing. The body is slidably disposed on the assembling side of the housing. The handle is pivotally connected to the assembling side of the housing. At least a part of the body is located between the handle and the fastening structure. The hook is located on a side of the handle that is located closest to the confining protrusion. The handle is configured to move the body to push the fastening part of the cage to force the fastening structure to be removed from the counterpart of the fastening part.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
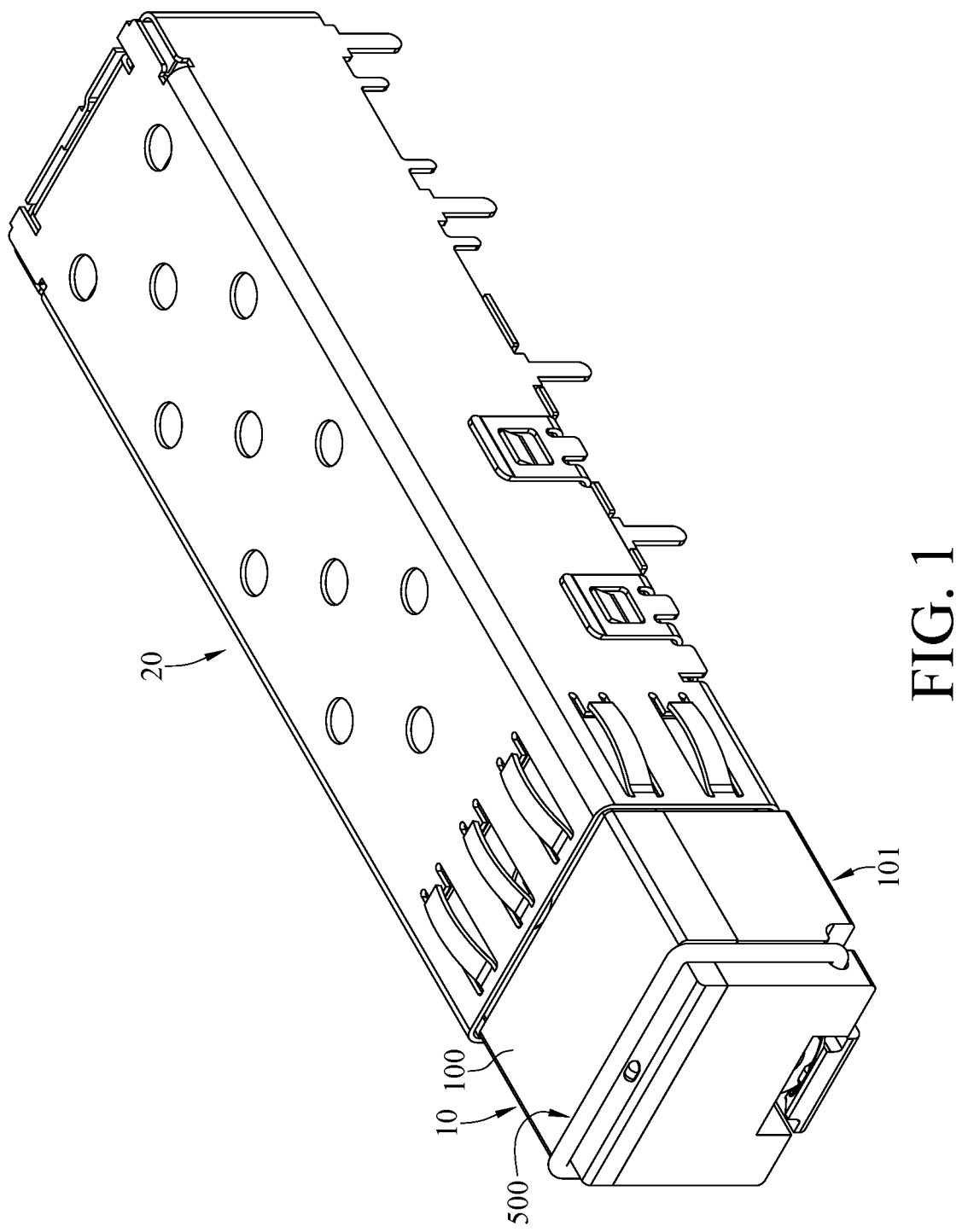
FIG. 1 is a perspective view of an optical transceiver according to one embodiment of the disclosure and a cage.
Figure 2:
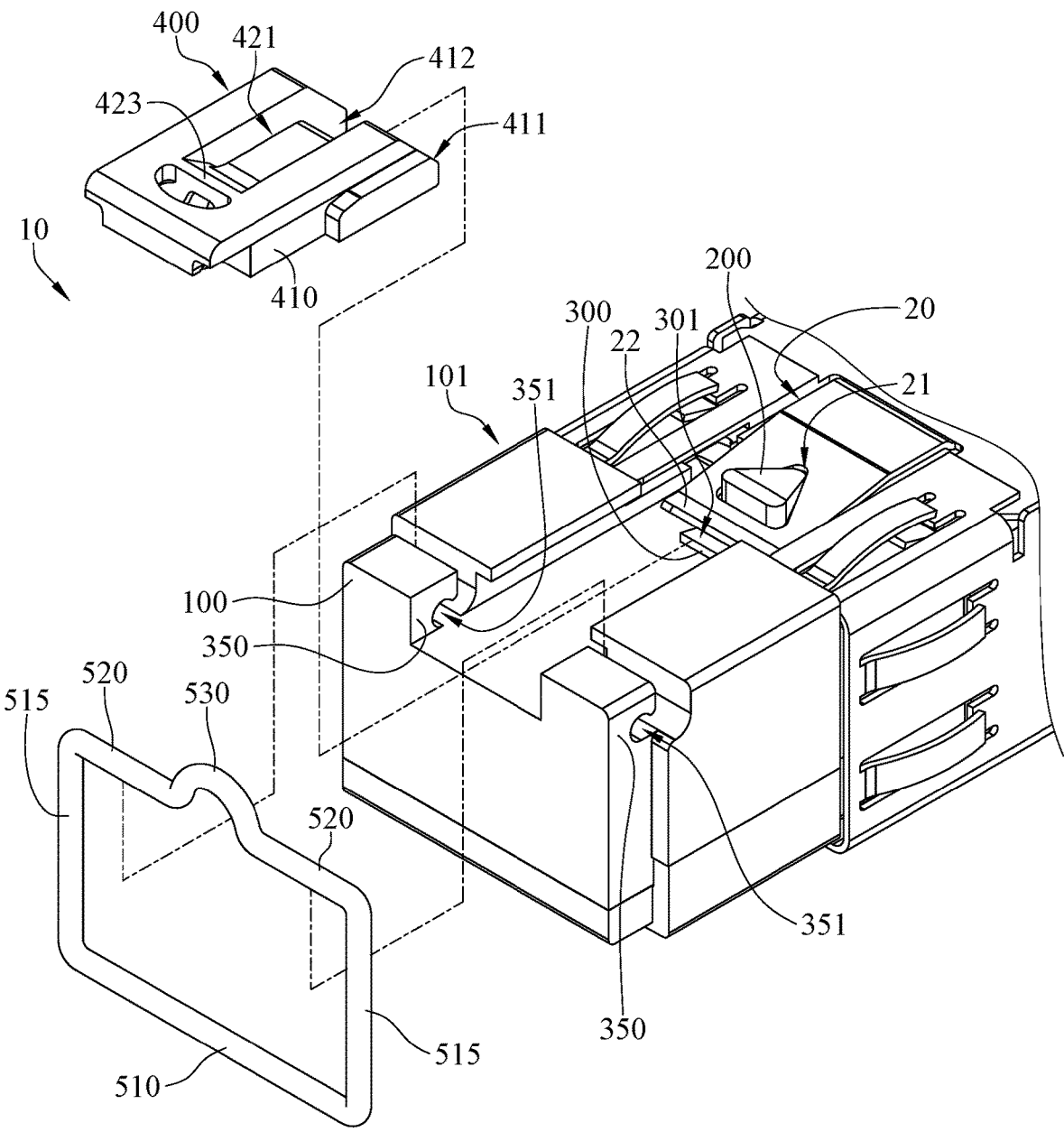
FIG. 2 is a partially enlarged exploded view of the optical transceiver and the cage in FIG. 1.
Figure 3:
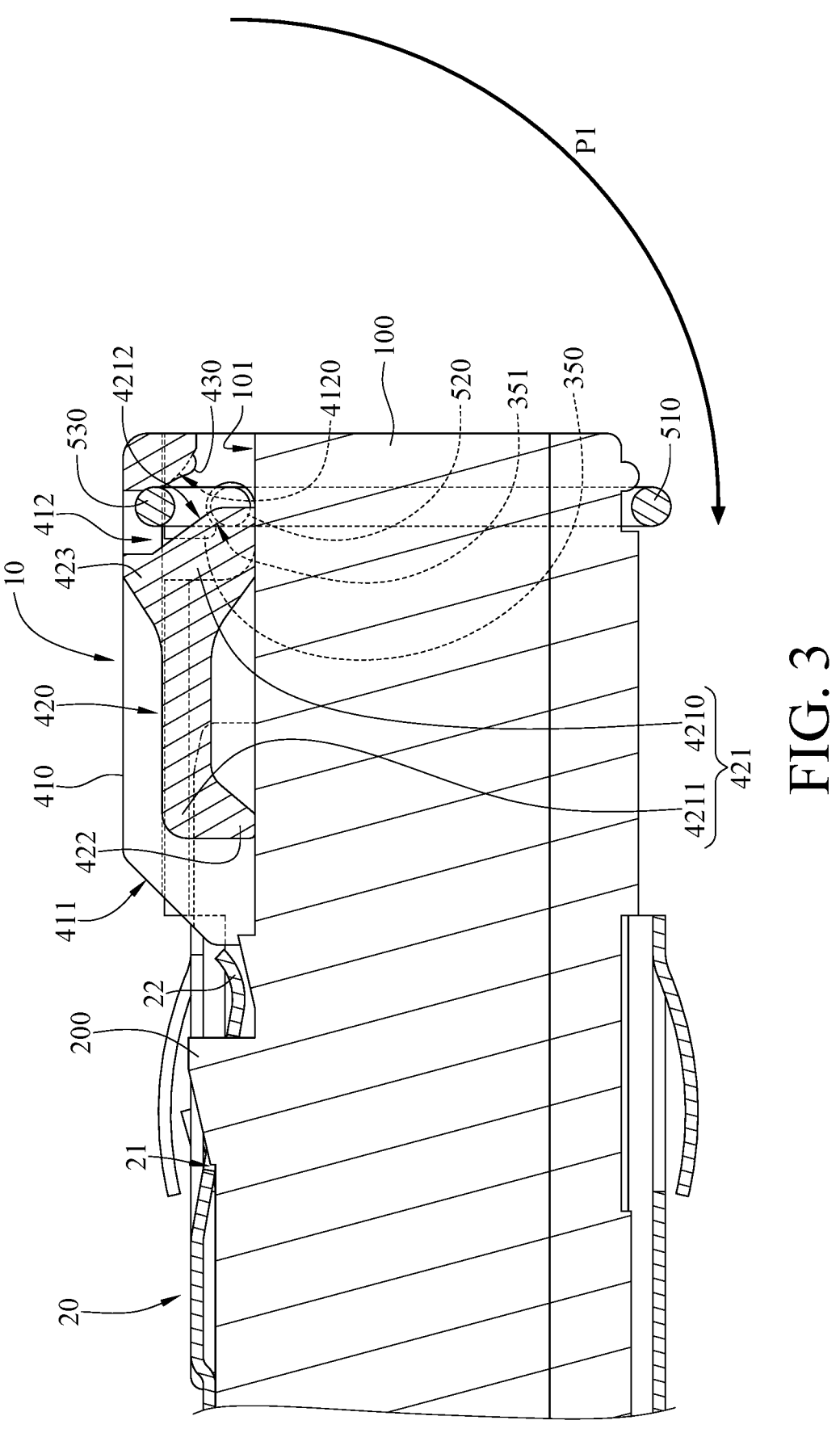
FIG. 3 is a partially enlarged cross-sectional view of the cage and the optical transceiver in FIG. 1.

Please refer to FIGS. 1-3. FIG. 1 is a perspective view of an optical transceiver according to one embodiment of the disclosure and a cage in which the optical transceiver is inserted. FIG. 2 is a partially enlarged exploded view of the optical transceiver and the cage in FIG. 1. FIG. 3 is a partially enlarged cross-sectional view of the cage and the optical transceiver in FIG. 1.

In this embodiment, an optical transceiver 10 may be configured to be fastened with a counterpart 21 of a fastening part 22 of a cage 20. The fastening part 22 may be an elastic arm. The counterpart 21 may be a slot. The optical transceiver 10 may comport with Small Form-factor Pluggable (SFP), Small Form-factor Pluggable Double Density (SFP-DD) or Dual Small Form-factor Pluggable (DSFP).

In this embodiment, the optical transceiver 10 may include a housing 100, a fastening structure 200, a confining protrusion 300, two pivot bases 350, a slider 400 and a handle 500. The housing 100 may have an assembling side 101. The fastening structure 200 may be located on the assembling side 101 of the housing 100. The fastening structure 200 may be a protrusion protruding from the assembling side 101 of the housing 100. In this embodiment, the assembling side 101 may be at the bottom of the housing 100. That is, the assembling side 101 may be a bottom side of the housing 100. However, it is noting that the assembling side may be at the side or the top of the housing in some other embodiments. The fastening structure 200 may be fastened with the counterpart 21. In one implementation, the counterpart 21 and the fastening structure 200 may be a slot and a protrusion, respectively, allowing for them to be snap fitting with each other. Note that, the disclosure is not limited by the configurations of the counterpart 21 and the fastening structure 200. In other embodiments, the counterpart and the fastening structure may be a protrusion and a slot, respectively.

The confining protrusion 300 may protrude from the assembling side 101 of the housing 100. In this embodiment, the confining protrusion 300 may be integrally formed as a single piece with the housing 100. In this embodiment, the confining protrusion 300 protruding from the assembling side 101 of the housing 100 may have an inclined guiding surface 301. The inclined guiding surface 301 may face away from the assembling side 101 of the housing 100. The confining protrusion 300 is not limited to have the inclined guiding surface 301. In other embodiments, the confining protrusion may not have the inclined guiding surface 301.

The two pivot bases 350 may protrude from the assembling side 101 of the housing 100. In this embodiment, the two pivot bases 350 may be integrally formed as a single piece with the housing 100. Note that the disclosure is not limited by the connection relationship between the confining protrusion 300, the pivot bases 350 and the housing 100. In other embodiments, the confining protrusion, the pivot base and the housing may be separate structures before being assembled together.

In this embodiment, the slider 400 may include a body 410, an elastic arm 420 and a restoring protrusion 430. In this embodiment, the body 410, the elastic arm 420 and the restoring protrusion 430 may be integrally formed as a single piece. Note that the disclosure is not limited by the connection relationship between the body 410, the elastic arm 420 and the restoring protrusion 430. In other embodiments, the body, the elastic arm and the restoring protrusion may be separate structures that are assembled to each other.

The body 410 may be slidably disposed on the assembling side 101 of the housing 100. In this embodiment, the body 410 may have an inclined pushing surface 411 and a recess 412. The inclined pushing surface 411 may face the fastening structure 200. The recess 412 may be formed on a side of the body 410 that is located closest to the fastening structure 200. Specifically, the recess 412 may be formed on the inclined pushing surface 411. In detail, the recess 412 may penetrate through the inclined pushing surface 411 and may extend inward from the inclined pushing surface 411. In this embodiment, the elastic arm 420 may include a cantilever 421, a hook 422 and a rib 423. The cantilever 421 may include a fixed end part 4210 and a movable end part 4211 that are opposite to each other. The cantilever 421 may be located in the recess 412. The fixed end part 4210 may be fixed to the body 410. In this embodiment, the fixed end part 4210 may have an inclined pushed surface 4212. The inclined pushed surface 4212 may face away from movable end part 4211. The hook 422 may protrude from the movable end part 4211 toward the housing 100. The rib 423 may protrude from the fixed end part 4210 away from the housing 100. The rib 423 may be in direct contact with the body 410 to enhance the entire structural strength of the slider 400. The restoring protrusion 430 may protrude from a bottom surface 4120 of the body 410 that is located in the recess 412.

Note that the body 410 is not limited to have the recess 412. In other embodiments, the body may not have the recess 412 and the cantilever of the elastic arm may protrude from an outer surface of the body. The fixed end part 4210 is not limited to have the inclined pushed surface 4212. In other embodiments, the fixed end part may not have the inclined pushed surface 4212. The body 410 is not limited to have the inclined pushing surface 411. In other embodiments, the body may not have the inclined pushing surface 411. The elastic arm 420 is not limited to include the rib 423. In other embodiments, the elastic arm may not include the rib 423.

The two pivot bases 350 may be located farther away from the fastening structure 200 than the body 410. Each pivot base 350 may include a pivoting recess 351. In each pivot base 350, the pivoting recess 351 may be formed on a side of the pivot base 350 that is located closest to the body 410.

The handle 500 may be pivotally connected to the assembling side 101 of the housing 100. In detail, in this embodiment, the handle 500 may include a held rod 510, two connecting rods 515, two pivoted rods 520 and a pushing rod 530. Two opposite ends of each pivoted rod 520 may be connected to the held rod 510 and the pushing rod 530, respectively. Two opposite ends of the held rod 510 may be connected to the two pivoted rods 520 via the two connecting rods 515, respectively. The two pivoted rods 520 may be located in the two pivoting recesses 351 to be pivotally connected to the two pivot bases 350, respectively. At least a part of the body 410 may be located between the handle 500 and the fastening structure 200. The hook 422 may be located between the handle 500 and the confining protrusion 300. In this embodiment, the pushing rod 530 may protrude away from the held rod 510. The disclosure is not limited by the shape of the pushing rod 530. In other embodiments, the pushing rod may be a cylindrical rod. The optical transceiver 10 is not limited to include the pivot bases 350. In other embodiments, the optical transceiver may not include the pivot bases 350.

Figure 4:
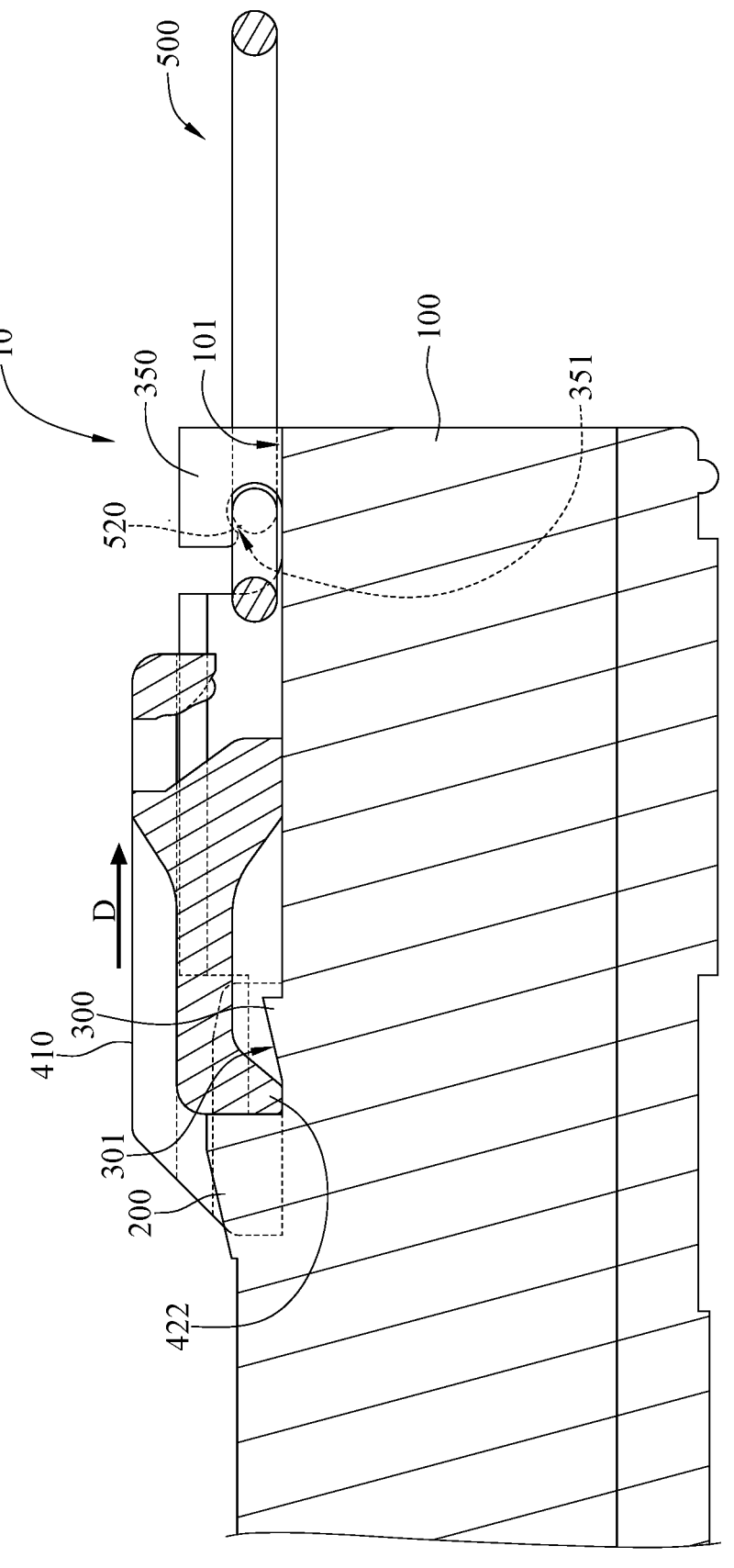
FIGS. 4 and 5 show an engaging process of the optical transceiver and the cage in FIG. 1.
Figure 5:
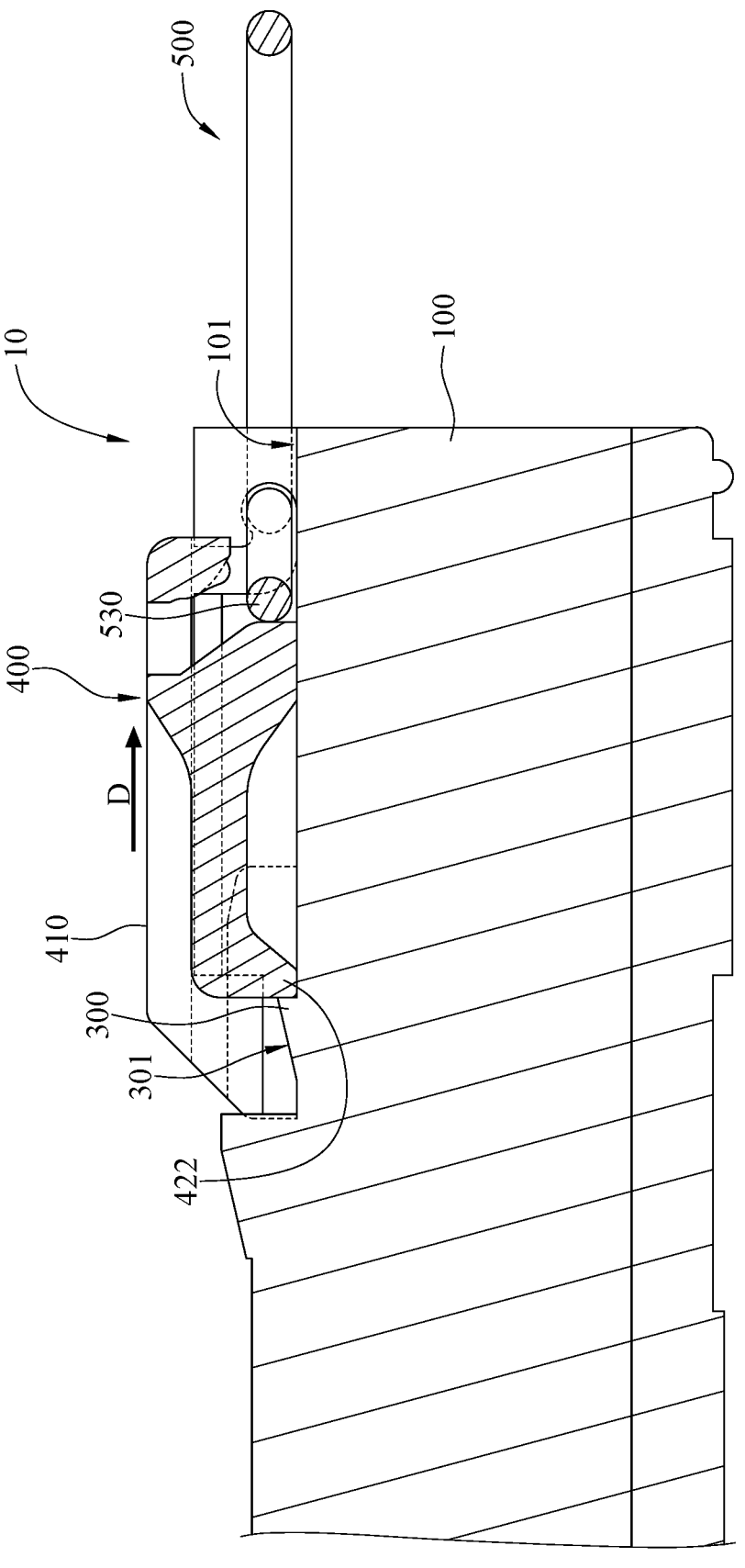

Hereinafter, the assembling process of the optical transceiver 10 according to the disclosure and the cage 20 may be described. Please refer to FIGS. 3-5. FIGS. 4 and 5 show an engaging process of the optical transceiver and the cage in FIG. 1. As shown in FIG. 4, the body 410 may be slidably disposed on the assembling side 101 of the housing 100 along a sliding direction D, and the pivoted rods 520 of the handle 500 may be placed into the pivoting recesses 351 to be pivotally connected to the pivot bases 350, respectively. Note that the pivoted rods 520 may be pivotally connected to the pivot bases 350 by riveting the pivoted rods 520 into the pivoting recesses 351 of the pivot bases 350. In this way, the pivot bases 350 may slightly deform and thus the pivoted rods 520 may be firmly positioned in the pivoting recesses 351. As shown in FIG. 4, when the pivoted rods 520 are respectively pivotally connected to the pivot bases 350, the hook 422 may be located between the confining protrusion 300 and the fastening structure 200, and the handle 500 may be placed along the sliding direction D. Next, as shown in FIG. 5, the body 410 may slide along the sliding direction D. Thus, the hook 422 may be moved along the inclined guiding surface 301 of the confining protrusion 300, and then may rest on the assembling side 101 of the housing 100. Accordingly, the hook 422 may be in contact with the confining protrusion 300 and a side of the body 410 that is located farthest from the hook 422 may be in contact with the pushing rod 530 of the handle 500. That is, the slider 400 may be clamped between the confining protrusion 300 and the pushing rod 530 of the handle 500, such that the slider 400 may be prevent from being detached from the housing 100 during the assembling process. Next, as shown in FIG. 3, the held rod 510 of the handle 500 may be pivoted along a first pivoting direction P1 (which may be clock-wise from this point of view), such that the restoring protrusion 430 may be pushed by the pushing rod 530 to force the body 410 to be moved away from the fastening structure 200. Then, the fastening structure 200 may be fastened with the counterpart 21 of the fastening part 22 of the cage 20. As such, the engaging process of the optical transceiver 10 and the cage 20 might conclude.

Figure 6:
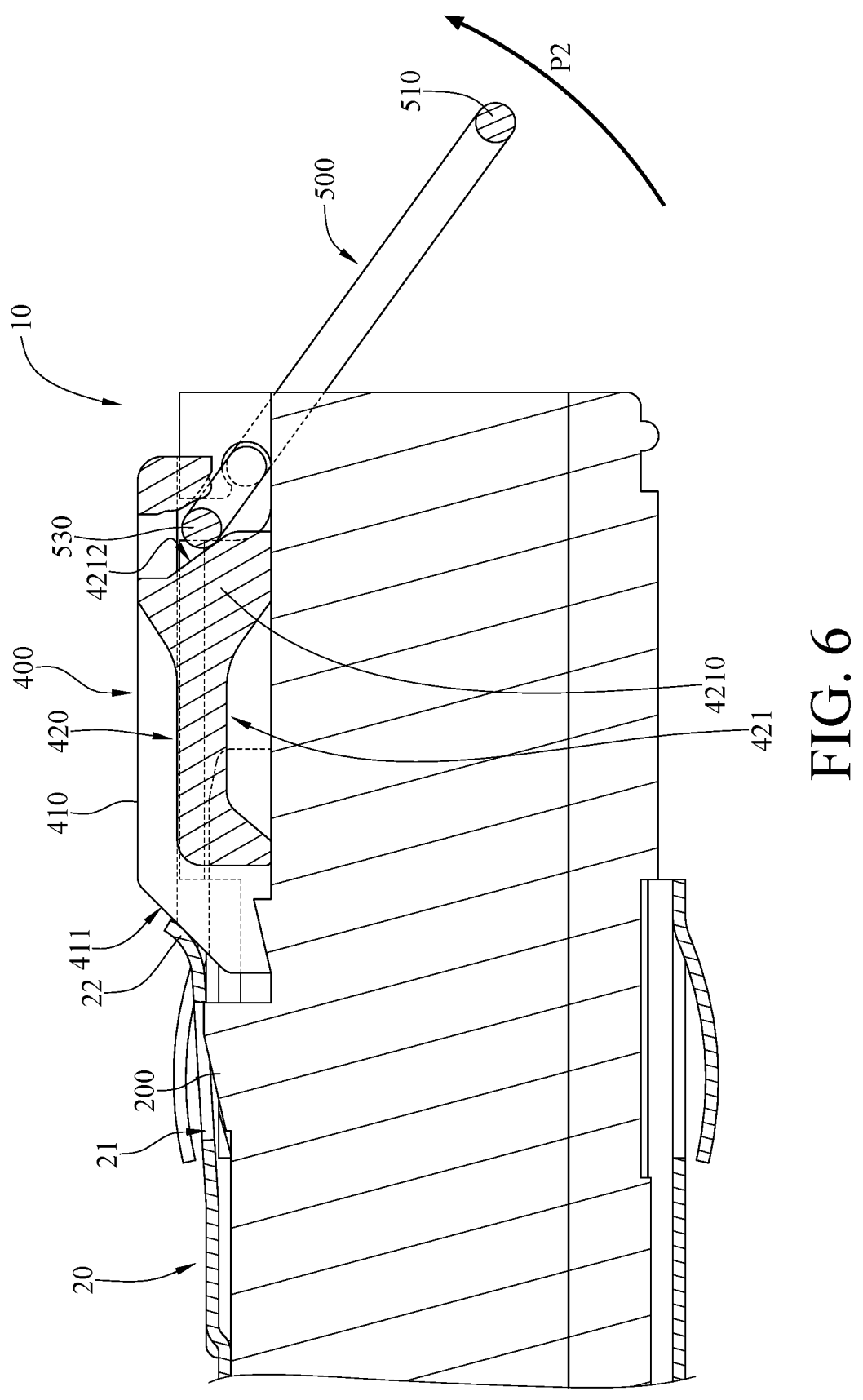
FIG. 6 shows a disengaging process of the optical transceiver in FIG. 1.

Please refer to FIG. 6. FIG. 6 shows a disengaging process of the optical transceiver and the cage in FIG. 1. As shown in FIG. 6, the held rod 510 of the handle 500 may be pivoted along a second pivoting direction P2 (which may be counter-clock wise from this point of view) opposite to the first pivoting direction P1 in FIG. 3, such that the pushing rod

530 may press the inclined pushed surface 4212 to force the inclined pushing surface 411 of the body 410 to push the fastening part 22 of the cage 20. Thus, the fastening structure 200 may be removed from the counterpart 21, thereby completing the disengaging process of the optical transceiver 10.

Figure 7:
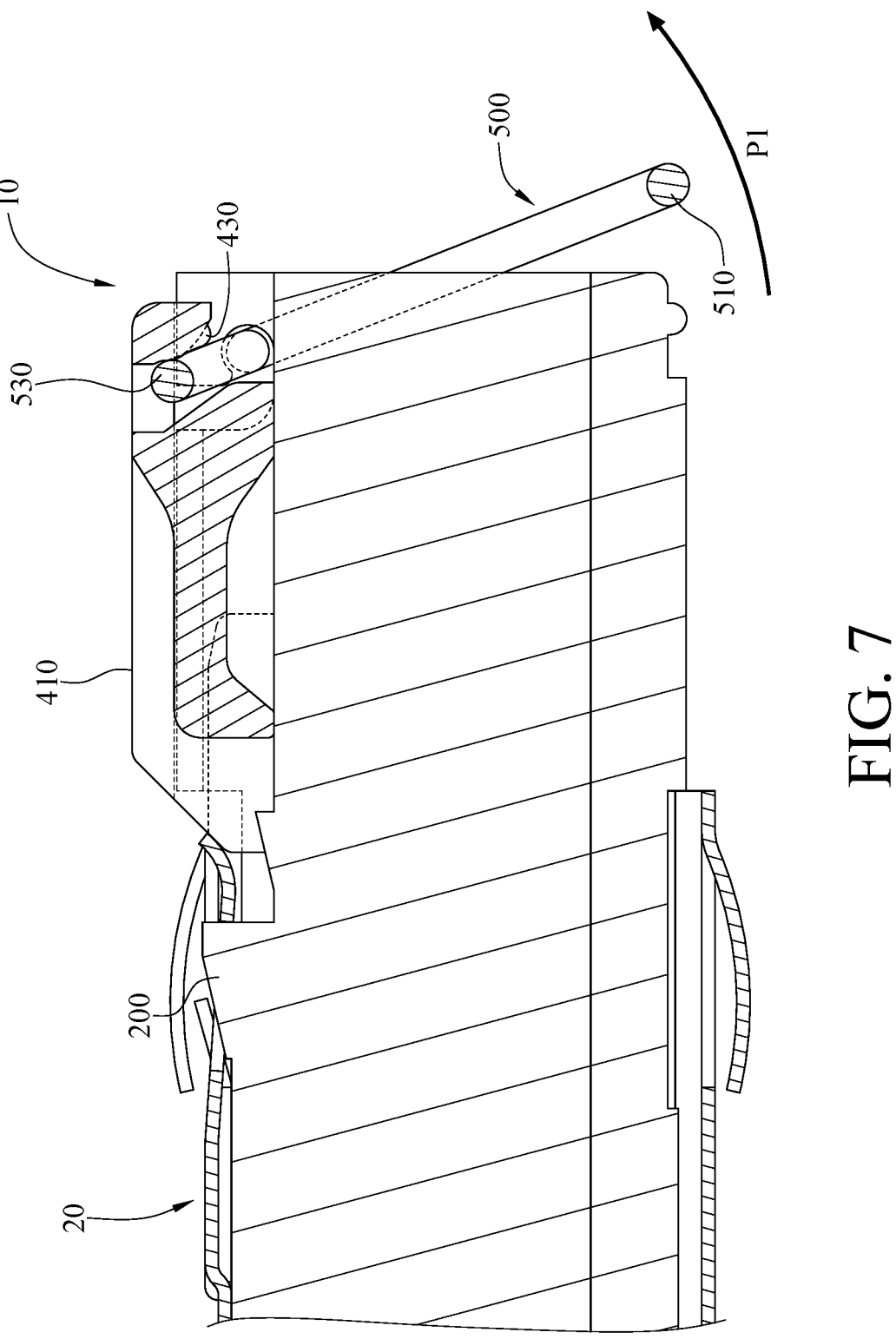
FIG. 7 shows a restoring process of the optical transceiver in FIG. 1.

Please refer to FIG. 7. FIG. 7 shows a restoring process of the optical transceiver in FIG. 1. As shown in FIG. 7, the held rod 510 of the handle 500 may be pivoted along the first pivoting direction P1, such that the restoring protrusion 430 may be pushed by the pushing rod 530 to force the body 410 to be moved away from the fastening structure 200, thereby completing the restoring process. Then, a subsequent engaging process may be performed.

Note that the slider 400 is not limited to include the restoring protrusion 430. In other embodiments, the slider may not include the restoring protrusion 430 and the body may be moved away from the fastening structure manually.

According to the optical transceiver disclosed by the above embodiments, the fixed end part of the cantilever of the elastic arm may be fixed to the body, and the hook protruding from the movable end part of the cantilever may be located between the handle and the confining protrusion. Thus, with the hook and the confining protrusion, the slider or the handle may be prevented from being detached from the housing. Also, the confining protrusion and the hook are respectively located on existing housing and existing slider without being fixed using an additional fastener such as a screw. Therefore, comparing to the conventional optical transceiver where the slider is confined by a confining block fixed to the housing by a screw and the handle is pushed by a spring, the material for manufacture the optical transceiver may be saved and the assembling process of the optical transceiver and the cage may be simplified while preventing the slider and the handle from being detached from the housing.

In addition, the pivot base to which the pivot rod of the handle is pivotally connected may located on the existing housing while preventing the handle from being detached from the housing. Thus, the material for manufacture the optical transceiver may further be saved and the assembling process of the optical transceiver and the cage may be further simplified.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical transceiver, configured to be fastened with a counterpart of a fastening part of a cage, the optical transceiver comprising:

a housing;

a fastening structure, disposed on an assembling side of the housing and fastened with the counterpart;

a confining protrusion, protruding from the assembling side of the housing;

a slider, comprising a body and an elastic arm, wherein the elastic arm comprises a cantilever and a hook, the cantilever comprises a fixed end part and a movable end part that are opposite to each other, the fixed end part is fixed to the body, the hook protrudes from the movable end part toward the housing, and the body is slidably disposed on the assembling side of the housing; and a handle, pivotally connected to the assembling side of the housing, wherein at least a part of the body is located between the handle and the fastening structure, the hook is located on a side of the handle that is located closest to the confining protrusion, and the handle is configured to move the body to push the fastening part of the cage to force the fastening structure to be removed from the counterpart of the fastening part.

2. The optical transceiver according to claim 1, further comprising two pivot bases, wherein the two pivot bases protrude from the assembling side of the housing, the two pivot bases are located farther away from the fastening structure than the body, each of the two pivot bases comprises a pivoting recess, in each of the two pivot bases, the pivoting recess is formed on a side of the pivot base that is located closest to the body, the handle comprises a held rod, two pivoted rods and a pushing rod, two opposite ends of each of the two pivoted rods are connected to the held rod and the pushing rod, respectively, the pushing rod is configured to push the slider to force the body to push the cage, and the two pivoted rods are located in the two pivoting recesses to be pivotally connected to the two pivot bases, respectively.

3. The optical transceiver according to claim 1, wherein a recess of the body is formed on a side of the body that is located closest to the fastening structure, and the cantilever of the elastic arm is located in the recess.

4. The optical transceiver according to claim 2, wherein the pushing rod of the handle protrudes away from the held rod.

5. The optical transceiver according to claim 2, wherein the confining protrusion, the two pivot bases and the housing are integrally formed as a single piece, and the elastic arm and the body are integrally formed as a single piece.

6. The optical transceiver according to claim 2, wherein an inclined pushed surface of the fixed end part of the cantilever of the elastic arm faces away from the movable end part, and the inclined pushed surface is configured to be pushed by the pushing rod.

7. The optical transceiver according to claim 3, wherein the slider further comprises a restoring protrusion, the restoring protrusion protrudes from a bottom surface of the body that is located in the recess, and the restoring protrusion is configured to be pushed by the pushing rod to force the body to be moved away from the fastening structure.

8. The optical transceiver according to claim 3, wherein an inclined pushing surface of the body faces the fastening structure, and the recess is formed on the inclined pushing surface.

9. The optical transceiver according to claim 1, wherein the elastic arm further comprises a rib, and the rib protrudes from the fixed end part away from the housing, and the rib is directly connected to the body.

10. The optical transceiver according to claim 1, wherein an inclined guiding surface of the confining protrusion faces away from the housing.

* * * * *